(12) United States Patent
Tahira et al.

(10) Patent No.: US 6,185,268 B1
(45) Date of Patent: Feb. 6, 2001

(54) MAIN STEAM PRESSURE DISTURBANCE PREVENTING APPARATUS OF NUCLEAR POWER PLANT

(75) Inventors: Masayoshi Tahira, Kanagawa-ken; Hiroyuki Hoshi, Saitama-ken, both of (JP)

(73) Assignee: Kabushiki Kaisha Toshiba, Kawasaki (JP)

( * ) Notice: Under 35 U.S.C. 154(b), the term of this patent shall be extended for 0 days.

(21) Appl. No.: 09/115,522

(22) Filed: Jul. 15, 1998

(30) Foreign Application Priority Data

| Aug. 29, 1997 | (JP) | 9-233934 |
| Sep. 29, 1997 | (JP) | 9-264032 |
| Mar. 25, 1998 | (JP) | 10-076851 |

(51) Int. Cl.$^7$ ............ G21C 17/00; G21D 1/00; G21F 9/02
(52) U.S. Cl. ............ 376/283; 376/245; 422/4; 422/159; 422/903; 73/290 R; 73/700
(58) Field of Search ............ 376/245, 283; 422/4, 159, 903; 73/290 R, 700

(56) References Cited

U.S. PATENT DOCUMENTS

| 3,660,041 | * | 5/1972 | Morre et al. | 23/262 |
| 4,119,706 | * | 10/1978 | Rogers | 423/580 |
| 4,594,227 | * | 6/1986 | Ohsaki et al. | 422/148 |
| 4,741,879 | * | 5/1988 | McLean et al. | 376/301 |
| 4,911,879 | * | 3/1990 | Heck et al. | 376/301 |

FOREIGN PATENT DOCUMENTS

| 3004677 | * | 8/1981 | (DE) . |
| 3035103 | * | 3/1982 | (DE) . |
| 59-119297 | * | 7/1984 | (JP) . |
| 62-166929 | * | 3/1989 | (JP) . |
| 8-062375 | * | 3/1996 | (JP) . |
| 8-62375 | | 3/1996 | (JP) . |
| 8-320247 | * | 12/1996 | (JP) . |
| 9-208201 | * | 8/1997 | (JP) . |
| 11-109091 | * | 4/1999 | (JP) . |
| 11-125687 | * | 5/1999 | (JP) . |

* cited by examiner

Primary Examiner—Charles T. Jordan
Assistant Examiner—Jack Keith
(74) Attorney, Agent, or Firm—Oblon, Spivak, McClelland, Maier & Neustadt, P.C.

(57) ABSTRACT

A main steam pressure disturbance preventing apparatus of a nuclear power plant including, one of a pressure detector and a water level detector provided in one of a steam system from a reactor of the nuclear power plant and a drain system connected to the steam system, an instrumentation pipe connected between one of the pressure detector and the water level detector and one of the steam system and the drain system, and catalyst installed in one of the pressure detector, the water level detector and the instrumentation pipe for recombining hydrogen and oxygen.

17 Claims, 7 Drawing Sheets

MAIN STEAM PRESSURE DISTURBANCE PREVENTING APPARATUS OF NUCLEAR POWER PLANT

BACKGROUND OF THE INVENTION

1. Field of the Invention

The present invention relates to a main steam pressure disturbance preventing apparatus of a nuclear power plant which is so constructed as to be able to prevent pressure disturbance produced due to the disturbance of the liquid level of a pressure detection pipe or a water level detector generated when hydrogen and oxygen contained in vapor generated as a result of radiolysis of core cooling water in a main steam system or a drain system at a nuclear power plant are dissolved into liquid phase of the pressure detection pipe or the water level detector and the dissolved gas is evaporated due to the decrease of the process pressure, and thus, maintain pressure and water level measurements in the satisfactory state.

2. Description of the Related Art

At a boiling water reactor power plant, a main steam pipe is connected to a reactor pressure vessel in order to lead steam generated in a reactor core directly to a turbine. Assuming the possible break of the main steam pipe, main steam separation valves are provided at the inside and the outside of a reactor container, respectively to form a reactor coolant pressure boundary.

Figure 10:
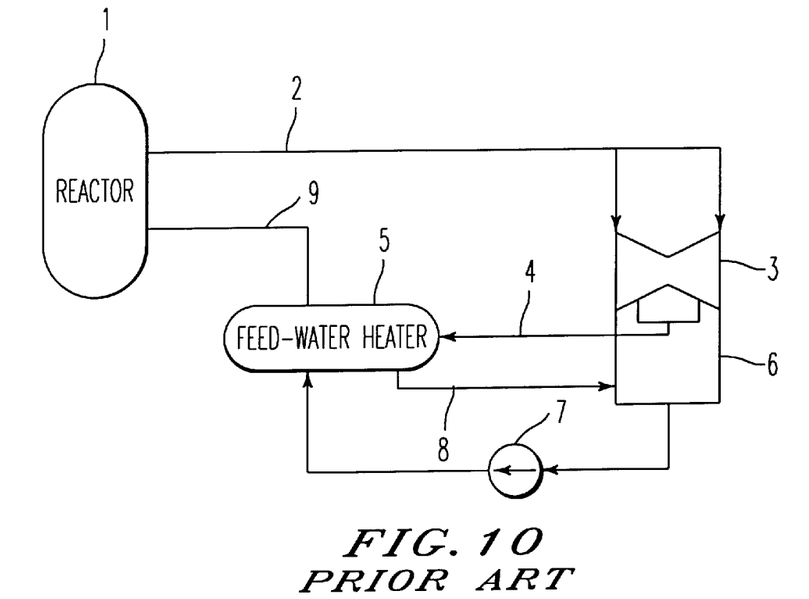
FIG. 10 is a system diagram showing one example of a conventional boiling water nuclear power plant.

The outline of the main steam system and the drain system of a boiling water reactor power plant will be briefly explained referring to FIG. 10. Steam generated in a reactor 1 is sent to a steam turbine 3 by passing through a main steam pipe 2 of the main steam system along with hydrogen and oxygen produced as a result of the radiolysis. Part of the steam worked in steam turbine 3 is sent to a feed-water heater 5 by passing through a turbine bleeding pipe 4.

On the other hand, the remainder of the steam worked in steam turbine 3 is condensed in a condenser 6, boosted by a feed-water pump 7 and sent to feed-water heater 5. In this feed-water heater 5, feed-water from feed-water pump 7 is heated by the steam worked in steam turbine 3, and this heated feed-water is sent to reactor 1 by passing through a feed-water pipe 9.

The steam that was heat exchanged in feed-water heater 5 is condensed to drain and recovered by condenser 6 after passing through a drain pipe 8 of the drain system. As the steam generated in reactor 1 is accompanied with hydrogen and oxygen produced as a result of the radiolysis, hydrogen and oxygen exist in the small amount in the main steam system and the drain system, as described above.

Figure 11:
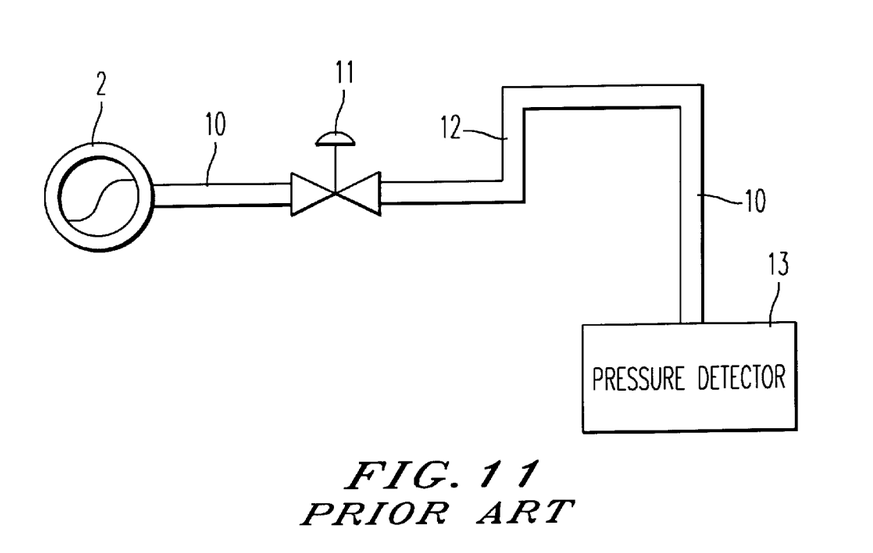
FIG. 11 is a piping system diagram to detect a main steam pressure in the conventional boiling water nuclear power plant shown in FIG. 10.

For measuring pressure in main steam pipe 2 of the main steam system, as shown in FIG. 11, a detection pipe 10 is connected to a pressure detection seat (not shown) of main steam pipe 2, and a main instrumentation valve 11 and an upward detection pipe 12 are connected to detection pipe 10 and a pressure detector 13 is connected to detection pipe 10 at the downstream side. Here, as hydrogen and oxygen exist in main steam pipe 2 as described above, hydrogen and oxygen having lower specific gravity than steam may possibly be accumulated in upward detection pipe 12.

In detection pipe 10, water is filled so as to give a prescribed hydrostatic head to pressure detector 13. Accumulated hydrogen and oxygen are dissolved into the liquid phase of detection pipe 10. When the process side pressure is decreased, the hydrogen and oxygen dissolved in the liquid phase of detection pipe 10 are boiled under the reduced pressure. The hydrostatic head applied to pressure detector 13 is changed due to the disturbance of the liquid phase of detection pipe 10 by the boiling under the reduced pressure. The thus caused disturbance of the liquid level appears as the disturbance to the output signal of pressure detector 13. As a result of this disturbance, there are such problems that the supervision and control of the nuclear power plant are adversely affected.

SUMMARY OF THE INVENTION

Accordingly, one object of this invention is to provide a main steam pressure disturbance preventing apparatus of a nuclear power plant, which is capable of recombining hydrogen and oxygen gradually by catalyst and removing them in a pressure detector or a water level detector connected to a steam system or a drain system, preventing thereby pressure disturbance, and thus maintaining the pressure and water level measurements in a satisfactory state.

Another object of this invention is to provide a main steam pressure disturbance preventing apparatus of a nuclear power plant, which is capable of recombining hydrogen and oxygen gradually by catalyst and removing them in an instrumentation pipe for connecting a pressure detector or a water level detector to a steam system or a drain system, preventing thereby pressure disturbance, and thus maintaining the pressure and water level measurements in a satisfactory state.

Still another object of this invention is to provide a main steam pressure disturbance preventing apparatus of a nuclear power plant, which is capable of recombining hydrogen and oxygen gradually by catalyst provided on a catalyst plated layer on a thin disc-state plate and removing them in a pressure detector or a water level detector connected to a steam system or a drain system, preventing the drain containing metals dropped from the upper space of a detection container of the pressure detector or the water level detector from adhering to the surface of the thin disc-state plate, and thereby preventing the drop of performance of catalyst due to the adhered drain containing metals.

These and other objects of this invention can be achieved by providing a main steam pressure disturbance preventing apparatus of a nuclear power plant including, one of a pressure detector and a water level detector provided in one of a steam system from a reactor of the nuclear power plant and a drain system connected to the steam system, an instrumentation pipe connected between one of the pressure detector and the water level detector and one of the steam system and the drain system, and catalyst installed in one of the pressure detector, the water level detector and the instrumentation pipe for recombining hydrogen and oxygen.

According to one aspect of this invention, there is provided a main steam pressure disturbance preventing apparatus of a nuclear power plant including, one of a pressure detector and a water level detector provided in one of a steam system from a reactor of the nuclear power plant and a drain system connected to the steam system, an instrumentation pipe connected between one of the pressure detector and the water level detector and one of the steam system and the drain system, and a cylindrical thin plate inserted in the instrumentation pipe with a catalyst plated layer plated on an inner surface of the cylindrical thin plate with a catalyst for recombining hydrogen and oxygen.

According to another aspect of this invention, there is provided a main steam pressure disturbance preventing apparatus of a nuclear power plant including, one of a pressure detector and a water level detector provided in one of a steam system from a reactor of the nuclear power plant and a drain system connected to the steam system, an instrumentation pipe connected between one of the pressure detector and the water level detector and one of the steam system and the drain system, and a thin disc plate provided at an inner surface of an upper lid of a detection container of one of the pressure detector and the water level detector. The thin disc plate is provided with a center hole and a small cylindrical projection with a curved surface rising from around the center hole, and the thin disc plate is provided with a catalyst plated layer plated on an under surface of the thin disc plate and on an outer surface of the small cylindrical projection with a catalyst for recombining hydrogen and oxygen.

According to still another aspect of this invention, there is provided a main steam pressure disturbance preventing apparatus of a nuclear power plant including, one of a pressure detector and a water level detector provided in one of a steam system from a reactor of the nuclear power plant and a drain system connected to the steam system, an instrumentation pipe connected between one of the pressure detector and the water level detector and one of the steam system and the drain system, and a thin disc plate provided at an inner surface of an upper lid of a detection container of one of the pressure detector and the water level detector. The thin disc plate is provided with a center hole, a small cylinder and a thin ring plate at an under surface of the thin disc plate, and the thin ring plate has a catalyst plated layer plated on an under surface of the thin ring plate with a catalyst for recombining hydrogen and oxygen.

According to a further aspect of this invention, there is provided a main steam pressure disturbance preventing apparatus of a nuclear power plant including, one of a pressure detector and a water level detector provided in one of a steam system from a reactor of the nuclear power plant and a drain system connected to the steam system, an instrumentation pipe connected between one of the pressure detector and the water level detector and one of the steam system and the drain system, and a tapered thin plate provided at an inner surface of an upper lid of a detection container of one of the pressure detector and the water level detector. The tapered thin plate is thicker at a central portion than at a peripheral portion, and is provided with a center hole and a catalyst plated layer plated on an under surface of the tapered thin plate with a catalyst for recombining hydrogen and oxygen.

According to another aspect of this invention, there is provided a main steam pressure disturbance preventing apparatus of a nuclear power plant including, one of a pressure detector and a water level detector provided in one of a steam system from a reactor of the nuclear power plant and a drain system connected to the steam system, an instrumentation pipe connected between one of the pressure detector and the water level detector and one of the steam system and the drain system, and a thin disc plate provided at an inner surface of an upper lid of a detection container of one of the pressure detector and the water level detector. The thin disc plate is provided with a center hole, a catalyst plated layer plated on an under surface of the thin disc plate with a catalyst for recombining hydrogen and oxygen, and a ring for preventing drain adherence on the under surface of the thin disc plate around the center hole.

According to still another aspect of this invention there is provided a main steam pressure disturbance preventing apparatus of a nuclear power plant including: one of a pressure detector and a water level detector provided in one of a steam system from a reactor of the nuclear power plant and a drain system connected to the steam system, an instrumentation pipe connected between one of the pressure detector and the water level detector and one of the steam system and the drain system, and a float stem penetrating through an upper lid of a detection container of one of the pressure detector and the water level detector. The float stem is provided with a catalyst plated layer plated on a surface of the float stem with a catalyst for recombining hydrogen and oxygen.

To prevent the pressure disturbance that is caused by the accumulated hydrogen and oxygen, it is necessary to remove hydrogen and oxygen before their densities increase. To remove hydrogen and oxygen, it will be effective to install a catalyst to accelerate the recombination of hydrogen and oxygen as proposed in this invention and gradually recombine them before their densities become high.

Further, for instance, when steam flows into the upper space of a pressure detector or a water level detector and is condensed in the upper space of the detector, and the generated drain drops to a detecting container of the detector, the drain may possibly adhere to the surface of a thin disc-state plate having a catalyst plated layer of platinum (Pt), etc. attached to the upper lid of the detection container.

If metals such as chrome, etc. contained in a float stem, etc. are melted into this drain, such metals are separated from the drain adhered to the catalyst plated layer of platinum (Pt), etc. provided at the surface of the thin disc-state plate, and may cover the surface of the catalyst plated layer.

However, even when the drain is adhered to the surface of the catalyst plated layer and metals melted in the drain are separated, according to the present invention it is possible to prevent the drop of the recombination function of hydrogen and oxygen without reducing the contacting area of hydrogen, oxygen and catalyst in a detection container.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Referring now to the drawings, wherein like reference numerals designate identical or corresponding parts throughout the several views, the embodiments of this invention will be described below.

A main steam pressure disturbance preventing apparatus of a nuclear power plant according to a first embodiment of the present invention will be described referring to FIG. 1. The same component elements in FIG. 1 as those shown in FIG. 11 will be assigned with the same reference numerals and the explanations of duplicated portions will be omitted here.

Figure 1:
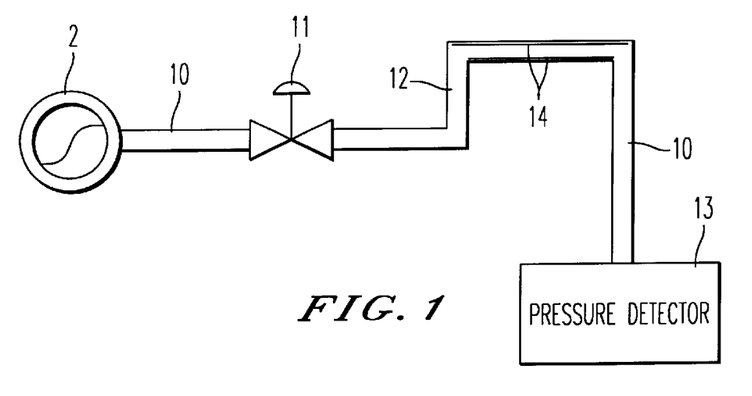
FIG. 1 is a piping system diagram showing a main steam pressure disturbance preventing apparatus of a nuclear power plant according to a first embodiment of this invention.

That is, in FIG. 1, in an instrumentation pipe of the steam system or the drain system with detection pipe 10, main instrumentation valve 11, upward detection pipe 12 and downstream side detection pipe 10 sequentially connected in series to main steam pipe 2, a catalyst 14 is installed in the inner surface at the top of upward detection pipe 12.

Hydrogen and oxygen produced as a result of radiolysis of core cooling water flow into the top of upward detection pipe 12 together with steam. As steam is condensed to drain and returned to main steam pipe 2, hydrogen and oxygen are accumulated in upward detection pipe 12. But the accumulated hydrogen and oxygen are recombined by catalyst 14 installed in detection pipe 12 and removed, and therefore, their densities do not increase to the levels to generate the disturbance of main steam pressure.

Further, although the example of pressure detector 13 is used for the explanation in FIG. 1, it is needless to say that this invention can be applied to an instrumentation pipe connected to a water level detector for pressure detector 13 in the same manner as described above.

Figure 2:
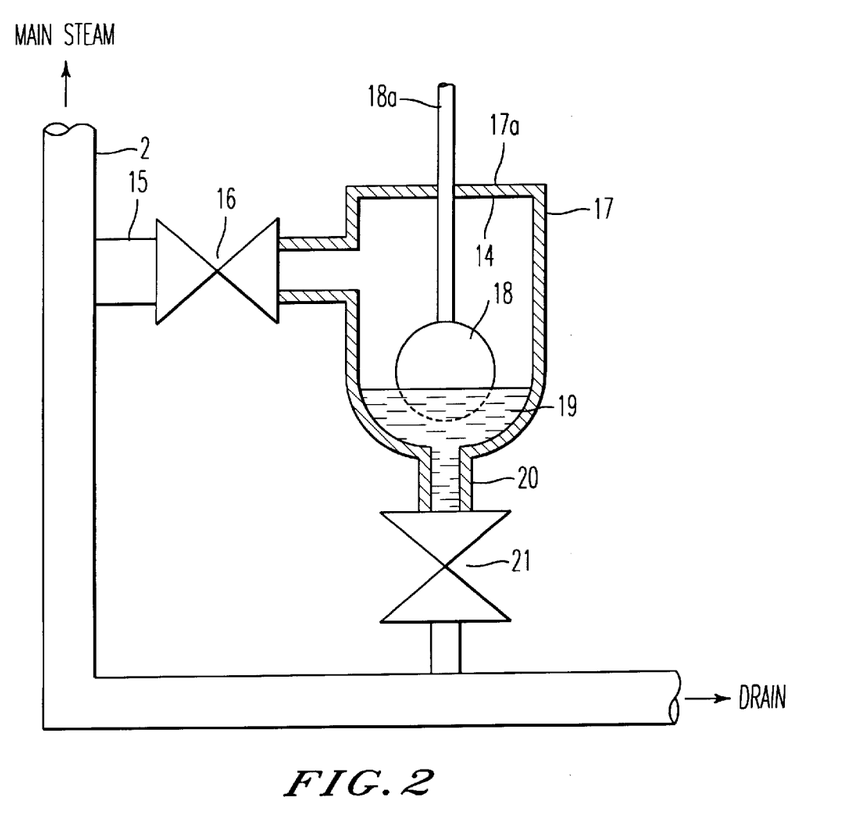
FIG. 2 is a piping system diagram showing a main steam pressure disturbance preventing apparatus of a nuclear power plant according to a second embodiment of this invention.

Next, a second embodiment of the present invention will be described referring to FIG. 2. FIG. 2 shows an example of the present invention applied to a water level detector that is generally used in the main steam system or the drain system.

In FIG. 2, an upper detection pipe 15 is branched and connected to main steam pipe 2, and a water level detector 17 is connected to this upper detection pipe 15 via an inlet valve 16. Water level detector 17 has a built-in float 18 to measure the water level of drain 19. At the bottom of water level detector 17, a lower detection pipe 20 is connected, and this lower detection pipe 20 is connected to the drain side of main steam pipe 2 via an outlet valve 21. Main steam from reactor 1 flows into the top of main steam pipe 2 and the downstream side of main steam pipe 2 is connected to the drain side.

At the top in water level detector 17, that is, in the inner surface of an upper lid 17a of water level detector 17, catalyst 14 is installed. Steam along with hydrogen and oxygen flow into water level detector 17 from main steam pipe 2 via upper detection pipe 15. In water level detector 17, steam is condensed to drain 19 which is then accumulated in the lower portion of water level detector 17 and hydrogen and oxygen are accumulated in the upper part of water level detector 17. However, the accumulated hydrogen and oxygen are recombined by catalyst 14 provided in water level detector 17 and are removed, and therefore, densities of hydrogen and oxygen will not increase.

In water level detector 17, float 18 moves upward with the increase of the water level of drain 19, a stem 18a connected to float 18 thereby moves upward to actuate a microswitch (not shown) that is set at a prescribed position, and thus, detects that drain 19 arrives at a specified water level.

Further, although the example of water level detector 17 is used for the explanation in FIG. 2, it is needless to say that this invention can be applied to a pressure detector for water level detector 17.

In the embodiments illustrated in FIG. 1 and FIG. 2, it is described that catalyst 14 is installed in the instrumentation pipe and the inner surface of the detector. As a means to install catalyst 14 in the detector or the instrumentation pipe, it is coated or welded. Thus, catalyst 14 can be installed easily and certainly.

Next, a third embodiment of the present invention will be described.

In the first and the second embodiment shown in FIG. 1 and FIG. 2, if hydrogen and oxygen are accumulated in the steam inflow portion of the instrumentation pipe or the detector while a nuclear power plant is in operation, the surface temperature of the instrumentation pipe or the detector becomes lower than the main steam temperature. Therefore, in this embodiment, a pressure detector or a water level detector is provided to the instrumentation pipe at a point where the surface temperature of the steam inflow portion drops to below a specified temperature after the plant operation and a catalyst is installed in the instrumentation pipe or the detector at that point from the economical viewpoint. The specified temperature is below 100° C.

Next, a fourth embodiment of the present invention will be described.

In the embodiments shown in FIGS. 1 and 2, examples of the means to install catalyst 14 in the inner surface of the instrumentation pipe or the detector through the coating or welding are explained. In this embodiment, catalyst 14 is formed in a meshed or granular shape in order to make the contact areas of hydrogen, oxygen and catalyst large for the purpose of increasing the effect of catalyst 14 for accelerating the recombination.

Further, as for catalyst 14 used in the embodiments described above, it will be described later in detail.

Next, a main steam pressure disturbance preventing apparatus of a nuclear power plant according to a fifth embodiment of the present invention will be described referring to FIG. 3. The same component elements used in FIG. 3 as those shown in FIG. 11 will be assigned with the same reference numerals and the explanations of the duplicated portions will be omitted.

Figure 3A:
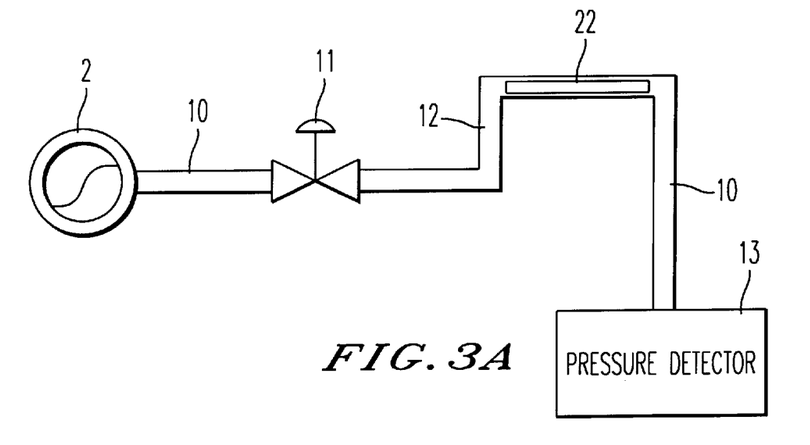
FIG. 3 is a piping system diagram showing a main steam pressure disturbance preventing apparatus of a nuclear power plant according to fifth, sixth and seventh embodiments of this invention.

That is, in FIG. 3, in a piping system shown in FIG. 3(a) composed of detection pipe 10, main instrumentation valve 11, upward detection pipe 12 and detection pipe 10 sequentially connected in series to main steam pipe 2, a cylindrical thin plate 22 is installed in upward detection pipe 12.

Figure 3B:
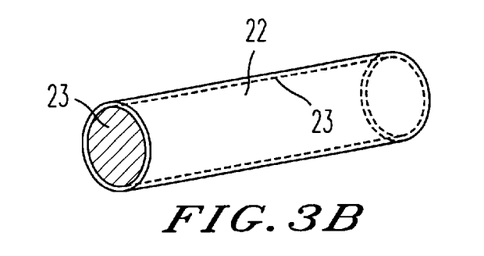

In the inner surface of cylindrical thin plate 22, a catalyst plated layer 23 plated with catalyst such as platinum, palladium, etc. is formed as shown in FIG. 3(b). Plated catalyst layer 23 is formed in a thickness of about 1 μm around the overall inner surface as shown by the partial hatching.

Hydrogen and oxygen flow into the top of upward detection pipe 12 along with steam. As steam is condensed to drain and returned to main steam pipe 2, hydrogen and oxygen are accumulated in upward detection pipe 12. However, they are recombined by catalyst plated layer 23 and therefore, it becomes possible to avoid the accumulation of hydrogen and oxygen.

Figure 3C:
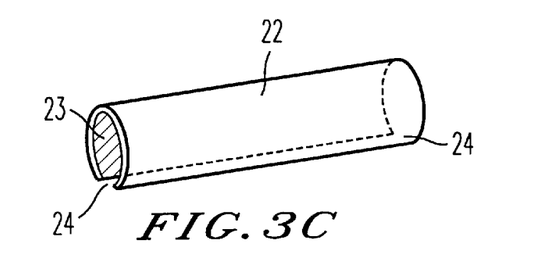

Next, a sixth embodiment of the present invention will be described referring to FIG. 3(c). In FIG. 3(c), a notched portion 24 is provided by notching the lower part of cylindrical thin plate 22, and catalyst plated layer 23 plated with platinum, palladium, etc. for use as a catalyst is provided in the inner surface of cylindrical thin plate 22. Notched portion 24 having a certain notched width will be sufficiently usable.

When hydrogen and oxygen are recombined by the catalyst and condensed to water, and the water is then accumulated in the lower part of the pipe, the catalyst becomes disable to display its performance by the water adhered to the surface of the catalyst. To avoid this, the present embodiment features that notched portion 24 is provided at the lower part of cylindrical thin plate 22. Further, when installing cylindrical thin plate 22 having catalyst plated layer 23 to the instrumentation pipe by welding, in consideration of the difference in thermal expansion between the instrumentation pipe and cylindrical thin plate 22, there is much flexibility against the circumferential elongation in this embodiment as notched portion 24 is provided at the lower part of cylindrical thin plate 22. Accordingly, this embodiment is more excellent in mountability when compared with the fifth embodiment with cylindrical thin plate 22 without notched portion 24 shown in FIG. 3(b).

Next, a seventh embodiment of the present invention will be described referring to FIG. 3(d).

Figure 3D:
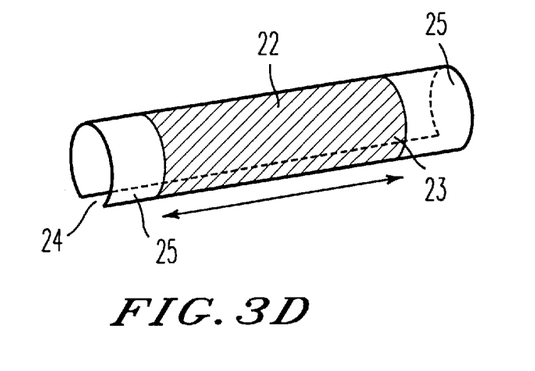

As shown in FIG. 3(d), this embodiment features that unplated layer (the blank portions) 25 are provided at both ends of cylindrical thin plate 22 and catalyst plated layer 23 is provided only at the central portion. According to this embodiment, it becomes possible to avoid adverse effects such as separation of the plate by the thermal effect when welding cylindrical thin plate 22 to the instrumentation pipe by avoiding the plating to both ends of cylindrical thin plate 22. As an example, it is desirable to leave the portions of about 50 mm from both ends of a 300 mm long cylindrical thin plate 22 as unplated layers 25 and make the plate thickness to about 1 μm in catalyst plated layer 23.

Then, an eighth embodiment of the present invention will be described.

This embodiment features that it is devised to avoid electrolytic corrosion of detection pipe 15 by using the same material as that of detection pipe 12 for cylindrical thin plate 22 provided with, along its inner surface, catalyst plated layer 23 plated by platinum, palladium, etc. As an example, a SUS 304L (JIS) made thin plate is used for cylindrical thin plate 22 for inserting into a SUS 316L (JIS) made instrumentation pipe.

A main steam pressure disturbance preventing apparatus of a nuclear power plant according to a ninth embodiment of this invention will be described referring to FIG. 4.

In FIG. 4, the same component elements as those shown in FIGS. 2 and 11 will be assigned with the same reference numerals and the explanations of the duplicated portions will be omitted. This embodiment shows an example of the main steam pressure disturbance preventing apparatus applied to a water level detector that is generally used in a main steam system or a drain system of a boiling water nuclear power plant.

Figure 4A:
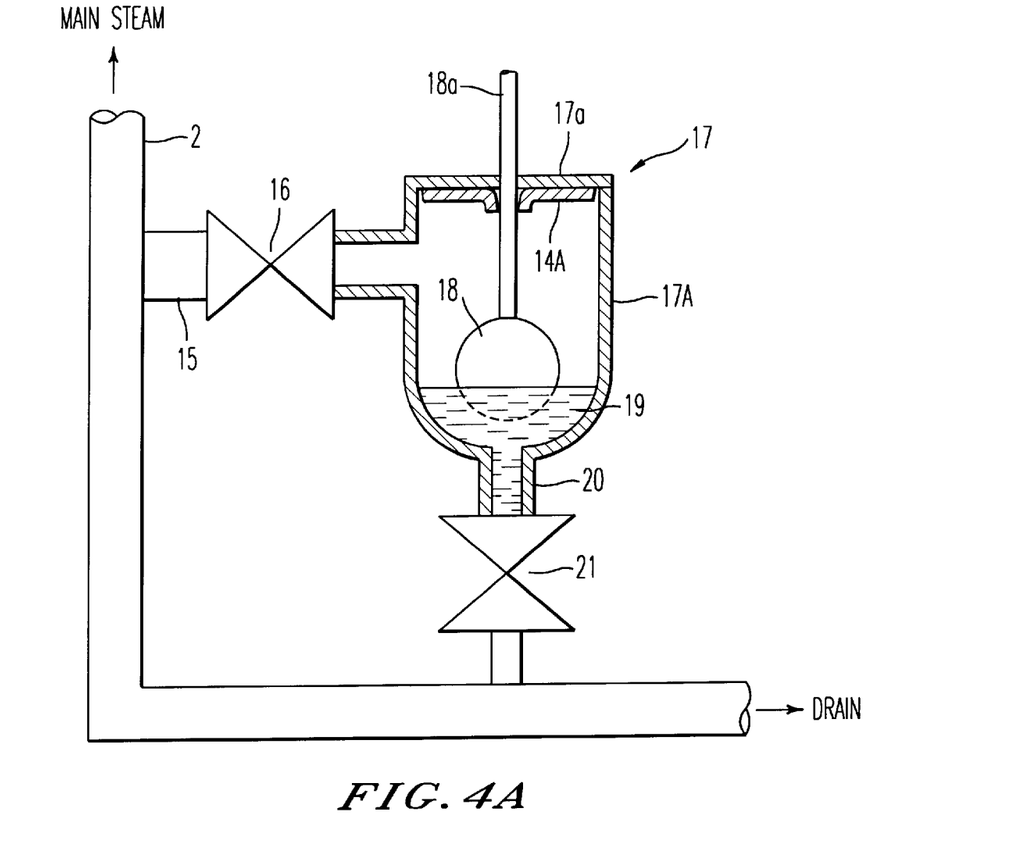
FIG. 4 is a piping system diagram showing a main steam pressure disturbance preventing apparatus of a nuclear power plant according to a ninth embodiment of this invention.

In FIG. 4(a), upper detection pipe 15 is branched and connected to main steam pipe 2, and a detection container 17A of water level detector 17 is connected to this upper detection pipe 15 via inlet valve 16. Float 18 is provided in detection container 17A to measure the water level of drain 19. Float stem 18a is connected to float 18. Float stem 18a is connected to a switch (not shown) by penetrating upper lid 17a.

Lower detection pipe 20 is connected to detection container 17A at its bottom. Lower detection pipe 20 is further connected to the drain side of main steam pipe 2 via outlet valve 21. Main steam from reactor 1 flows into main steam pipe 2 through its top, and the lower side of main steam pipe 2 is connected to the drain side.

A catalyst plated thin disc plate 14A is provided at the inner top portion of detection container 17A of water level detector 17, that is, the inner surface of upper lid 17a, plated with a catalyst, such as platinum, for recombining hydrogen and oxygen. Hydrogen and oxygen flow into detection container 17A along with steam from main steam pipe 2 via upper detection pipe 15. Steam is condensed to drain 19 and accumulated in the lower portion of detection container 17A, and hydrogen and oxygen are accumulated in the upper part of detection container 17A.

However, when hydrogen and oxygen are accumulated, they are recombined by the catalyst in catalyst plated thin disc plate 14A provided in detection container 17A and removed. Accordingly, the densities of hydrogen and oxygen do not increase.

When the water level of drain 19 in detection container 17A increases, float 18 moves upward, and float stem 18a connected to float 18 moves upward and actuates a microswitch (not shown) that is set at a specified position, and it is thus detected that a specified water level is reached.

Figure 4B:
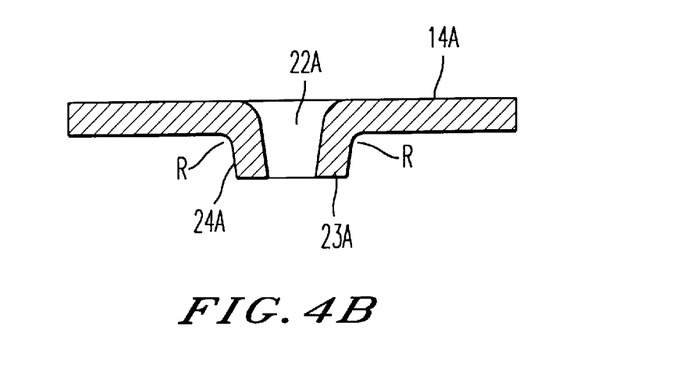

Thin disc plate 14A has a center hole 22A and a small cylindrical projection 23A rising from the circumference of this center hole 22A, and a rising portion 24A of this projection 23 has a curved surface R, as shown in FIG. 4(b). The surface of thin disc place 14A is provided with a catalyst plated layer of platinum, etc. for recombining hydrogen and oxygen.

Next, taking platinum (Pt) as an example of the catalyst for the catalyst plated layer provided on the surface of thin disc plate 14A, an example to provide a Pt catalyst plated layer on thin disc plate 14A according to an electrolytic plating method will be described.

That is, when providing a Pt plated layer to thin disc plate 14A according to the electrolytic plating method, after masking all portions of thin disc plate 14A except the portion on which platinum is plated, the plating is performed under the conditions shown below, out of general plating, using a solution close to neutral in order to prevent oxidation of material of thin disc plate 14A.

Platinum salt: $(NH_4)_2PtCl_2$,
Conductive salt: Phosphate of ammonium
pH: 4, Temperature: 80° C.,
Current density: 1.5 A/cm$^2$ It is desirable that the catalyst plated layer is sufficiently thick enough to remain on the surface and the amount of Pt is preferred as small as possible from the viewpoint of cost. Accordingly, a desirable thickness of Pt plated layer is about 1 μm.

According to this embodiment, as rising portion 24A of small cylindrical projection 23A provided at center hole 22A of thin disc plate 14A is formed to curved surface R, it is possible to avoid the drain dropped from the upper part of detection container 17A of water level detector 17 from adhering to the catalyst plated layer provided on the surface of thin disc plate 14A. As a result, it is possible to avoid the separation of such metals as chrome, etc. on the catalyst plated layer caused by the drain containing such metals adhered to the catalyst plated layer and thereby to avoid the drop of performance of catalyst resulting from decrease in the surface area of the catalyst plated layer.

Next, a tenth embodiment of the present invention will be described referring to FIG. 5.

Figure 5A:
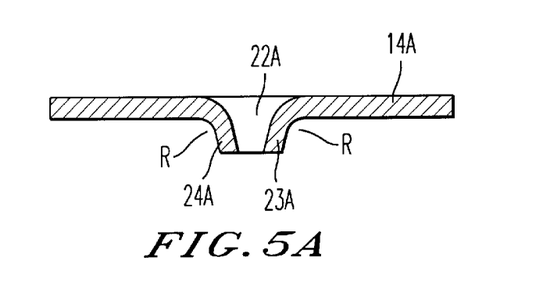
FIG. 5 is a diagram showing a main part of a main steam pressure disturbance preventing apparatus of a nuclear power plant according to a tenth embodiment of this invention.
Figure 5B:
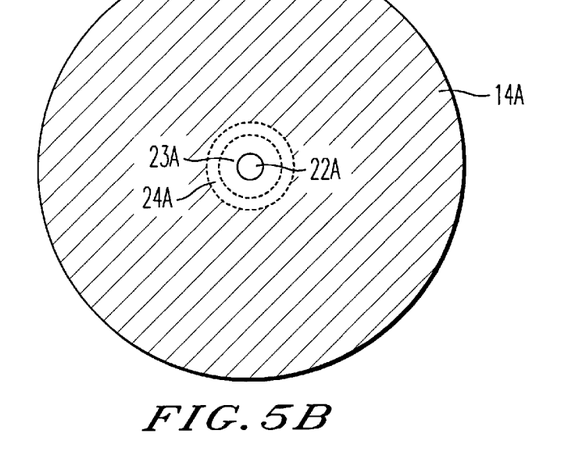

This tenth embodiment differs from the ninth embodiment in that the catalyst plated layer is provided on the surface of thin disc plate 14A except curved surface R of rising portion 24A of small cylindrical projection 23A rising from the circumference of center hole 22A of thin disc plate 14A. In FIGS. 5, (*a*) and (*b*) show a longitudinal sectional view of thin disc plate 14A and an under surface view thereof, respectively.

That is, in this embodiment the catalyst plated layer is not provided on curved surface R formed on rising portion 24A of small cylindrical projection 23A projecting from the circumference of center hole 22A on thin disc plate 14A but is provided on other surface of thin disc plate 14A (the hatched portion in FIG. 5(*b*)).

According to this embodiment, likewise the ninth embodiment, it is possible to prevent the drain from adhering to the catalyst plated layer. Due to the drop in the adherence state of the catalyst in the catalyst plated layer caused by the effect of the stress, etc. in the processing of the curved surface, the separation of the catalyst plated layer occurs during the subsequent use of a nuclear power plant. As the catalyst plated layer is not provided on curved surface R on thin disc plate 14A in this embodiment, it is possible to avoid the above-described adverse effects and thereby is possible to avoid the separated catalyst layer from being brought for the further process.

Figure 6:
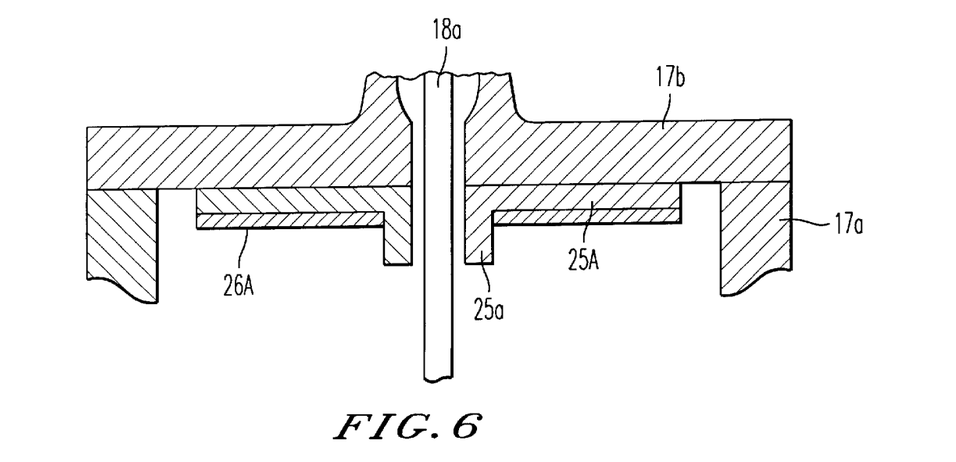
FIG. 6 is a longitudinal sectional view showing a main part of a main steam pressure disturbance preventing apparatus of a nuclear power plant according to an eleventh embodiment of this invention.

Next, an eleventh embodiment of the present invention will be described referring to FIG. 6.

This embodiment differs from the ninth embodiment in that a disc plate 25A having a short cylindrical portion 25*a* is directly installed at the center on the inner surface of upper lid 17*a* of detection container 17A, and a thin ring plate 26A having the catalyst plated layer on the under surface is provided on the under surface of this disc plate 25A except short cylindrical portion 25*a*. This thin ring plate 26A has a hole provided to fit it into the outside of short cylindrical portion 25*a*.

According to this embodiment, disc plate 25A having the cylinder is provided between thin ring plate 26A having the catalyst plated layer on its inner surface and upper lid 17*a* at the upper part of detection container 17A. As the drain drops along the inner surface of short cylindrical portion 25*a* from the upper part of detection container 17A by providing this disc plate 25A having the cylinder, it is possible to avoid the drain from adhering to the catalyst plated layer provided on the surface of thin ring plate 26A. Further, the electrolytic corrosion caused by dissimilar metals contact can be prevented by using the same material for disc plate 25A with the cylinder and thin ring plate 26A.

Figure 7:
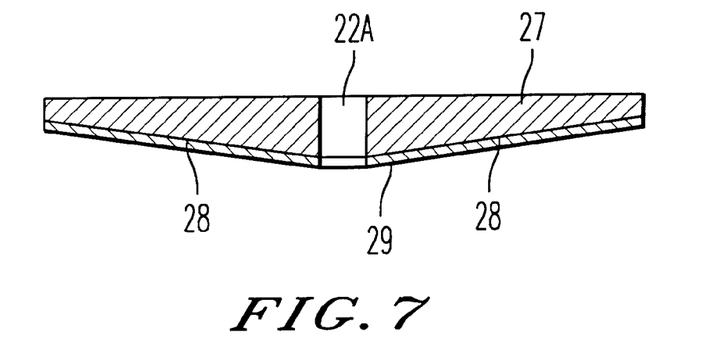
FIG. 7 is a longitudinal sectional view showing a main part of a main steam pressure disturbance preventing apparatus of a nuclear power plant according to a twelfth embodiment of this invention.

Next, a twelfth embodiment of the present invention will be described referring to FIG. 7.

This embodiment differs from the ninth embodiment in that a tapered thin plate 27 is provided for thin disc plate 14A. As shown in FIG. 7, tapered thin plate 27 has center hole 22A likewise thin disc plate 14A and has a dish shaped tapered surface 28 which becomes thinner toward the circumferential edge from the lower surface of center hole 22A. There is a catalyst plated layer 29 provided on tapered surface 28 plated with catalyst for recombining hydrogen and oxygen. Tapered thin plate 27 is thick at its center and thin at the circumferential edge.

According to this embodiment, it is possible to prevent the drain from adhering to catalyst plated layer 29 of tapered thin plate 27, because the drain flowing from the upper part of detection container 17A of water level detector 17 drops directly from center hole 22A, as tapered thin plate 27 provided with catalyst plated layer 29 at tapered surface 28 is installed on the lower surface of upper lid 17*a* of detection container 17A.

Next, a thirteenth embodiment of the present invention will be described referring to FIG. 8.

Figure 8A:
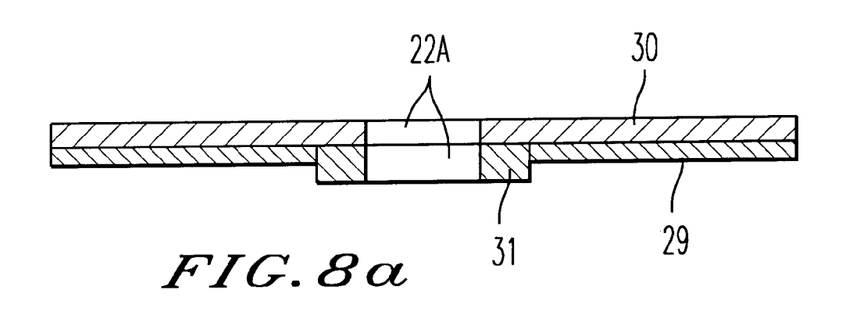
FIG. 8 is a diagram showing a main part of a main steam pressure disturbance preventing apparatus of a nuclear power plant according to a thirteenth embodiment of this invention.
Figure 8B:
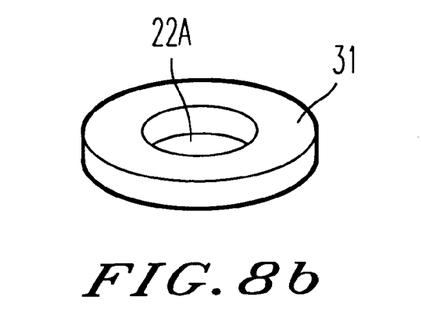

This embodiment differs from the ninth embodiment in that a thin disc plate 30 having a ring 31 for preventing drain adherence on the under surface is provided for thin disc plate 14A. That is, as shown in FIG. 8(*a*) showing a longitudinal sectional view of thin disc plate 30, thin disc plate 30 has center hole 22A and is provided with catalyst plated layer 29 at the under surface. On the under surface of thin disc plate 30, ring 31 for preventing drain adherence shown in FIG. 8(*b*) which shows a perspective view of ring 31 is installed by welding and this ring 31 has center hole 22A in the same diameter as that of center hole 22A of thin disc plate 30.

According to this embodiment, as ring 31 for preventing drain adherence is installed to the under surface of thin disc plate 30, the drain from the upper portion of detection container 17A of water level detector 17 drops along ring 31. Accordingly, it is possible to prevent the drain from adhering to catalyst plated layer 29 provided on thin disc plate 30. Further, the electrolytic corrosion caused by contact of dissimilar materials can be prevented by using the same material for ring 31 as that for thin disc plate 30.

Figure 9:
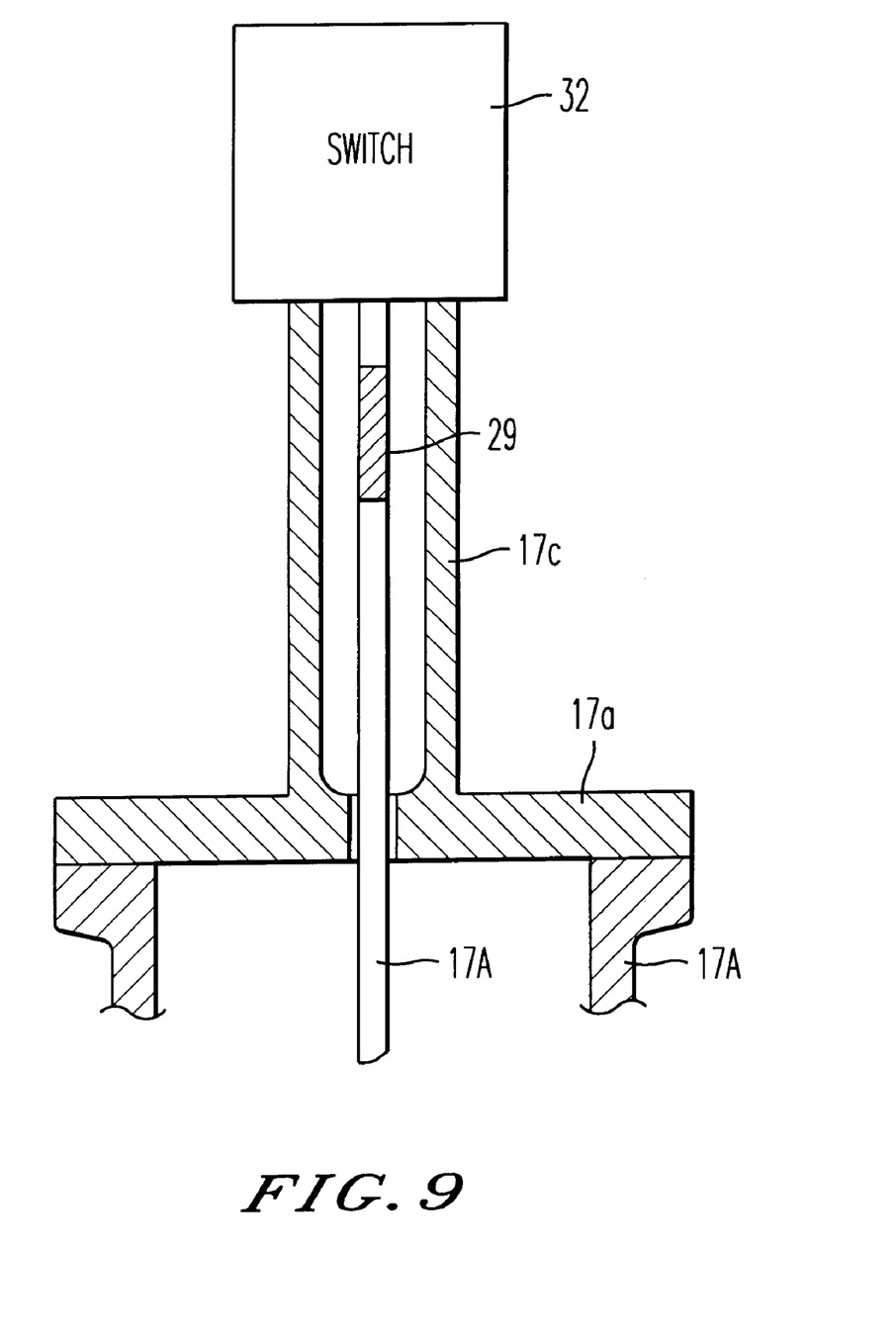
FIG. 9 is a longitudinal sectional view showing a main part of a main steam pressure disturbance preventing apparatus of a nuclear power plant according to a fourteenth embodiment of this invention.

Next, a fourteenth embodiment of the present invention will be described referring to FIG. 9.

This embodiment differs from the ninth embodiment in that catalyst plated layer 29 is provided to float stem 18*a* for thin disc plate 14A. That is, as shown in FIG. 9, catalyst plated layer 29 is provided to float stem 18*a*, and the tip of float stem 18*a* is connected to a switch 32. Float stem 18*a* is enclosed by cylinder 17*c* erected from upper lid 17*a*.

According to this embodiment, as float 18*a* provided with catalyst plated layer 29 is inserted in detection container 17A at its top, catalyst plated layer 29 is set vertically, and as a result, the drain can be prevented from adhering to the surface of catalyst plated layer 29.

Further, although the present invention has been explained taking a water level detector as an example in the ninth through the fourteenth embodiments, this invention can also be applied to a pressure detector likewise to the water level detector.

According to this invention, it is possible to provide a main steam pressure disturbance preventing apparatus of a nuclear power plant, which is capable of recombining hydrogen and oxygen gradually by catalyst and removing them in a pressure detector or a water level detector connected to a steam system or a drain system, preventing thereby pressure disturbance, and thus maintaining the pressure and water level measurements in a satisfactory state.

Further according to this invention, it is possible to provide a main steam pressure disturbance preventing apparatus of a nuclear power plant, which is capable of recombining hydrogen and oxygen gradually by catalyst and removing them in an instrumentation pipe for connecting a pressure detector or a water level detector to a steam system or a drain system, preventing thereby pressure disturbance, and thus maintaining the pressure and water level measurements in a satisfactory state.

According to the present invention, it is possible to provide a main steam pressure disturbance preventing apparatus of a nuclear power plant which is capable of maintaining the performance of catalyst for a long period and the measurements of pressure, water level, etc. in a satisfactory state, by preventing the drop of performance of catalyst by metals contained in drain and separated when the drain is adhered to the surface of a catalyst inserted for preventing hydrogen and oxygen to accumulate in a detection container of a water level detector or a pressure detector of a main steam system or a drain system of a nuclear power plant.

Obviously, numerous modifications and variations of the present invention are possible in light of the above teachings. It is therefore to be understood that within the scope of the appended claims, the invention may be practiced otherwise than as specifically described therein.

What is claimed is:

1. A main steam pressure disturbance preventing apparatus of a nuclear power plant, comprising:
    one of a pressure detector and a water level detector provided in one of a steam system from a reactor of said nuclear power plant and a drain system connected to said steam system;
    an instrumentation pipe connected between said one of said pressure detector and said water level detector and said one of said steam system and said drain system; and
    a catalyst installed in at least an inner surface at a top of one of said one of said pressure detector and said water level detector and said instrumentation pipe and configured to recombine hydrogen and oxygen.

2. The main steam pressure disturbance preventing apparatus of a nuclear power plant according to claim 1, wherein:
    said catalyst is installed in one of said one of said pressure detector and said water level detector and said instrumentation pipe by one of coating and welding.

3. The main steam pressure disturbance preventing apparatus of a nuclear power plant according to claim 1, wherein:
    said one of said pressure detector and said water level detector is installed at said instrumentation pipe at a point where a temperature at a steam inflow portion of one of said instrumentation pipe and said one of said pressure detector and said water level detector is lower than a prescribed temperature after operating said nuclear power plant; and
    said catalyst is installed in one of said instrumentation pipe and said one of said pressure detector and said water level detector at said point.

4. The main steam pressure disturbance preventing apparatus of a nuclear power plant according to claim 1, wherein:
    said catalyst is formed in one of meshed shape and granular shape in one of said one of said pressure detector and said water level detector and said instrumentation pipe.

5. The main steam pressure disturbance preventing apparatus of a nuclear power plant according to claim 1, wherein:
    said catalyst is installed in an inner surface at a top of an upward detection pipe in said instrumentation pipe.

6. The main steam pressure disturbance preventing apparatus of a nuclear power plant according to claim 1, wherein:
    said catalyst is installed in an inner surface of an upper lid of a detection container of one of said pressure detector and said water level detector.

7. The main steam pressure disturbance preventing apparatus of a nuclear power plant according to claim 1, further comprising:
    a cylindrical plate inserted in said instrumentation pipe and including a catalyst plated layer plated on an inner surface of said cylindrical plate,
    wherein said catalyst is disposed on said catalyst plated layer.

8. The main steam pressure disturbance preventing apparatus of a nuclear power plant according to claim 7, wherein
    a notched portion is provided at a lower side of said cylindrical plate with said catalyst plated layer plated on said inner surface of said cylindrical plate.

9. The main steam pressure disturbance preventing apparatus of a nuclear power plant according to claim 7, wherein:
    said cylindrical plate is attached to an inner surface of said instrumentation pipe by spot welding at two end portions of said cylindrical plate; and
    said cylindrical plate is provided with said catalyst plated layer on said inner surface of said cylindrical plate except at said two end portions of said cylindrical plate.

10. The main steam pressure disturbance preventing apparatus of a nuclear power plant according to claim 7, wherein
    said cylindrical plate with said catalyst plated layer on said inner surface is made of the same material as that of said instrumentation pipe.

11. The main steam pressure disturbance preventing apparatus of a nuclear power plant according to claim 7, wherein
    said cylindrical plate is installed in an inner surface at a top of an upward detection pipe in said instrumentation pipe.

12. The main steam pressure disturbance preventing apparatus of a nuclear power plant according to claim 1, further comprising:
    a detection container for one of said pressure detector and said water level detector, said detection container including an upper lid with an inner surface; and
    a disc plate provided at said inner surface and including a center hole, a cylindrical projection with a curved surface rising from around said center hole, and a catalyst plated layer plated on an under surface of said disc plate,
    wherein said catalyst is disposed on said catalyst plated layer and an outer surface of said cylindrical projection.

13. The main steam pressure disturbance preventing apparatus of a nuclear power plant according to claim 12, wherein
    said disc plate is provided with said catalyst plated layer except at said curved surface.

14. The main steam pressure disturbance preventing apparatus of a nuclear power plant according to claim 1, further comprising:
    a detection container for one of said pressure detector and said water level detector, said detection container including an upper lid with an inner surface; and a disc plate provided at said inner surface and including a center hole, a cylinder and a ring plate at an under surface of said disc plate, said ring plate having a catalyst plated layer plated on an under surface of said ring plate, wherein said catalyst is disposed on said catalyst plated layer.

15. The main steam pressure disturbance preventing apparatus of a nuclear power plant according to claim 1, further comprising:

a detection container for one of said pressure detector and said water level detector, said detection container including an upper lid with an inner surface; and a tapered plate provided at said inner surface and being thicker at a central portion than at a peripheral portion, said tapered plate including a center hole and a catalyst plated layer plated on an under surface of said tapered plate, wherein said catalyst is disposed on said catalyst plated layer.

16. The main steam pressure disturbance preventing apparatus of a nuclear power plant according to claim 1, further comprising:

a detection container for one of said pressure detector and said water level detector, said detection container including an upper lid with an inner surface; and a disc plate provided at said inner surface and including a center hole, a catalyst plated layer plated on an under surface of said disc plate, and a ring for preventing drain adherence on the under surface of said disc plate around said center hole, wherein said catalyst is disposed on said catalyst plated layer.

17. The main steam pressure disturbance preventing apparatus of a nuclear power plant according to claim 1, further comprising:

a detection container for one of said pressure detector and said water level detector, said detection container including an upper lid with an inner surface; and a float stem penetrating through said upper lid of said detection container and including a catalyst plated layer plated on a surface of said float stem, wherein said catalyst is disposed on said catalyst plated layer.

* * * * *